United States Patent [19]

Bridle

[11] Patent Number: 4,483,742
[45] Date of Patent: Nov. 20, 1984

[54] LIQUID SOAPS COMPRISING PINE OIL AND SOAP-MAKING ACID FOR USE IN PAPER-RECYCLING

[75] Inventor: Peter F. Bridle, London, England
[73] Assignee: SCM Corporation, New York, N.Y.
[21] Appl. No.: 469,679
[22] Filed: Feb. 25, 1983
[30] Foreign Application Priority Data
 Jun. 1, 1982 [GB] United Kingdom ............... 8215935
[51] Int. Cl.$^3$ .......................... C11D 9/00; D21C 5/02
[52] U.S. Cl. ......................................... 162/5; 162/8; 252/108; 252/117; 252/122; 252/132; 252/DIG. 14
[58] Field of Search ............... 252/108, 117, DIG. 14, 252/132, 122; 162/5, 8

[56] References Cited

U.S. PATENT DOCUMENTS

| | | | |
|---|---|---|---|
| 1,351,092 | 8/1920 | Baskerville et al. | 162/8 X |
| 1,993,362 | 3/1935 | Fulton | 162/5 X |
| 3,250,718 | 5/1966 | Foley et al. | 252/548 X |
| 3,703,472 | 11/1972 | Shaw et al. | 252/106 X |
| 3,953,351 | 4/1976 | Keller | 252/132 X |

*Primary Examiner*—John E. Kittle
*Assistant Examiner*—Mukund J. Shah
*Attorney, Agent, or Firm*—R. A. Sturges; M. H. Douthitt

[57] ABSTRACT

The present invention relates to liquid soaps for use in paper re-cycling and other industrial cleaning or scouring processes.

The liquid soap comprises an aqueous partially saponified mixture comprising 1 part of pine oil (a mixture of terpene alcohols and hydrocarbons) and from 1 to 20 parts of a soap-making fatty acid, such as tall oil or distilled oil. The mixture is preferably saponified by use of 30% sodium hydroxide solution. The liquid soap may contain less than 10% water.

15 Claims, No Drawings

LIQUID SOAPS COMPRISING PINE OIL AND SOAP-MAKING ACID FOR USE IN PAPER-RECYCLING

The present invention relates to liquid soaps, which will be of particular, but not exclusive, use in assisting the removal of ink and contaminate in the re-cycling of paper. It is also envisaged that the liquid soaps of the present invention will find use in a multiplicity of heavy duty scouring and bleaching processes.

Ink and contaminate may be loosened and eventually removed from printed paper by re-pulping the paper, usually in the presence of an alkali and any one of a variety of wetting agents. Bleaching agents and other chemicals may be included in the re-pulping solution. The ink and contaminate may then be removed in any one of a variety of washing processes. The wetting agent may be a soap or a detergent, for instance an alkali metal soap.

There are certain disadvantages in the use of conventional alkali metal soaps in de-inking processes. If the soap is to be transported in substantially dry form, such as powder or flakes, a substantial amount of energy must be used to remove water from the soaps which are usually prepared as aqueous solutions. The dry powder or flakes generally requires to be pre-dissolved before addition to the pulper. The nature of these soaps is such that aqueous solutions thereof having practicably high solids content require to be maintained at temperatures up to about 50° C. up to the point of introduction into the process. If the temperature of these solutions is allowed to drop below a critical point, they are liable to solidify to intractable masses of varying degrees of hardness and having poor heat-transfer properties. These masses will not readily re-melt and may require to be dug out of tanks, pumps, meters and pipe-lines. The same storage and handling problems are encountered if the soaps are transported in solution form. Moreover, the cost of transporting large volumes of water is becoming increasingly uneconomic.

Alternatively, a wide variety of synthetic detergents may be employed as wetting agents in de-inking processes. However, many of these materials have become increasingly expensive due to the rise in the price of oil from which they are derived. Additionally, the need to make these detergents biodegradable for many sytems and environments will increase the cost of these synthetic products.

According to the present invention, a liquid soap comprises a partially saponified aqueous composition containing :

(a) 1 part of a mixture of from 10 to 95% terpene alcohol and 90 to 5% terpene hydrocarbon, and (b) from 1 to 20 parts of a soap-making fatty acid, a glyceride oil or a mixture thereof.

All parts and percentages herein are by weight unless otherwise indicated.

The liquid soaps according to the present invention may contain as little as 10% or less water and still remain as mobile liquids at room temperature. They will retain their fluidity at temperatures down to 0° C. and therefore there is no requirement for external heating to maintain their fluidity. In the event of the liquid soaps according to the invention solidifying or congealing, for instance due to a drop in temperature to well below 0° C. during outside storage in exceptionally severe weather, they will regain their liquid form as their temperature rises to about 0° C. or above. With such low water content, the liquid soaps can be economically transported in liquid form.

The liquid soaps according to the present invention are completely biodegradable and may be produced from regenerable feedstocks (see below). The energy requirement for their preparation is low. The soaps have powerful solvent and emulsifying action and can reduce the requirement for alkali and other chemicals in, for instance, de-inking processes. The soaps greatly assist dirt removal and rinsing in both washing and air-flotation cleaning processes. The activation of the soaps may permit processes to be operated at temperatures lower than those that would be used if a conventional soap or detergent were used.

Preferably, the liquid soap is saponified to the extent of about 50% neutralisation. If the composition is saponified too far, the liquid form and mobility may be lost. If the composition is not saponified sufficiently, it may not behave as a soap. A person skilled in the art will be able easily to determine by trial and error the appropriate degree of saponification in any given composition.

The amount of water in the composition is preferably just sufficient to maintain the liquid form of the soap. In most cases, the liquid soap will contain less than 20%, most preferably less than 10%, water. Conveniently, the water and the saponifying agent are added to the composition together.

The saponifying agent is preferably an alkali, such as ammonium hydroxide or sodium or potassium hydroxide, or an amine such as ethanolamine. Conveniently the saponifying agent is a 30% solution of sodium hydroxide, which is available commercially as a caustic soda solution.

The soap-making fatty acid may be any of those known in the art. For instance, it may be oleic acid, linoleic acid, a vegetable-oil or fish-oil fatty acid, a tallow fatty acid or a mixture of any of these. A particularly suitable source of soap-making fatty acid is tall oil or distilled tall oil. These comprise mixtures of fatty acids and rosin acids in varying proportions and are by-products in Kraft pulping processes. Although the acid number of the soap-making fatty acid is not critical, it is conveniently about 180 to 200 mg KOH/g.

The glyceride oil may be a glyceride of any of the fatty acids mentioned above either alone or in mixtures.

Preferably, the composition comprises from 2 to 10, most preferably 2 to 5, parts of the fatty acid and/or glyceride oil.

The terpene alcohol and the terpene hydrocarbon may be a pure compound or a mixture of similar compounds. The mixture of the alcohol and the hydrocarbon may be prepared by mixing pure compounds or mixtures or pure compounds. However, it is preferred to use commercially available mixtures of terpene alcohols and terpene hydrocarbons. For instance, pine oils, which are known to comprise mixtures of terpene alcohols and terpene hydrocarbons, may be used. The proportions of the mixtures depend on the source and on the quality of the commercial product.

The liquid soap according to the present invention is conveniently prepared by mixing together the terpene mixture and the fatty acid and/or glyceride oil. The saponifying agent in aqueous solution is stirred in and sufficient heating is applied to ensure that the final composition is clear and homogeneous.

It is envisaged that the liquid soap of the present invention will be of particular, but not exclusive, use in the re-cycling of printed paper, i.e. to assist in the loosening and washing out of ink and other contaminate. However it may also find application in scouring and bleaching operations such as the scouring and bleaching of cotton staple and cotton linter, in wool scouring, in the de-greasing and scouring of animal skins and hide, for example in the preparation of lamb and sheep skins, and in the preparation of pig and other animal hide for tanning for the production of leather goods. The soaps may also find application in industrial laundering operations for the removal of heavy soiling.

It has been found that in many of these processes, because the soaps of this invention have unexpectedly good wetting and penetrating action, it is frequently possible to use lower temperatures than are necessary when using some conventional soaps and detergents. Alternatively their use will permit the employment of shorter washing cycles. The consequent reduced energy demand is expected to lead to substantial savings in many processes.

The present invention will now be illustrated by way of example only, with reference to the following compositions.

COMPOSITION 1

100 parts of Sylfat*—96 was mixed with 20 parts of Glidco* 150.
* indicates a registered trade mark.

Sylfat*—96 is commercially available tall oil fatty acid supplied by Sylvachem Corporation, Jacksonville, Fla., U.S.A. It comprises about 98% soap-making fatty acids and about 1% each of rosin acid and unsaponifiable material, and has an acid number of about 196 mg KOH/g.
* indicates a registered trade mark.

Glidco* 150 is a commercially available pine oil supplied by SCM Products Group, SCM Corporation, Jacksonville, Fla., USA. It comprises about 85% terpene alcohols (by volume) and has a specific gravity at 15.5° C. of at least 0.93. It comprises mainly alphaterpineol, with minor amounts of other terpene alcohols, in the terpene alcohol part, the remainder being made up of terpene hydrocarbons.
* indicates a registered trade mark.

To the mixture of Sylfat*—96 and Glidco* 150 was added 20 parts of a 30% aqueous solution of sodium hydroxide. A voluminous flocculent precipitate was formed. The mixture was heated to about 60° C. and stirred. The precipitate dissolved and, on cooling to room temperature, a clear homogenous liquid soap was formed. The soap contained about 90% solids and 10% water.
* indicates a registered trade mark.

COMPOSITION 2

Using a similar procedure to that set out with reference to composition 1 above, a liquid soap was prepared from the following components.

| Sylfat* — 96 | 100 parts |
| Glidco* — 150 | 50 parts |
| 30% sodium hydroxide solution | 20 parts |

*indicates a registered trade mark.

The liquid soap was liquid at room temperature and contained only about 8% water.

COMPOSITION 3

100 parts of a commercially available glyceride oil, comprising glycerides of $C_{18}$ fatty acids (mainly oleic and linoleic acids) were mixed with 50 parts of the pine oil mentioned above. 20 parts of 30% sodium hydroxide solution were added thereto and the mixture was heated with stirring until the required degree of saponification was achieved. On cooling a clear homogeneous liquid soap was formed. This had properties very similar to those of the soap composition 2.

In a laboratory de-inking process a soap solution was prepared by adding 0.4 ml. Composition 1 to one liter of water at 88° C. in a laboratory hydropulper. 24 grams of printed newspaper and 12 grams printed magazine stock were then charged and pulped for 30 minutes.

The resulting pulp was then allowed to soak for 30 minutes prior to dilution to one percent fibre solids with water at 60° C.

The diluted stock was treated by mechanical and air flotation in a flotation cell. Carbon black, oil, and black and coloured dyestuff/pigment were all easily removed from the fibre in the froth at the surface of the flotation cell over a period of 40 minutes, thus demonstrating the effectiveness of the liquid soap of the present invention.

On removal of most of the water from the treated stock and re-dilution to one percent fibre solids with cold water, a further period of 40 minutes air and mechanical flotation showed further release of contaminate in decreasing quantity as the flotation progressed, indicating almost complete removal of contaminate from the fibre. Fibre shrinkage was observed to be of an extremely low order in this process.

Similar results were observed with Composition 2, handled in the same way and at the same level of addition. However with the higher terpene modification a more stable froth was obtained throughout both periods of flotation (to give somewhat higher fibre shrinkage). Moreover, Composition 2 exerted markedly greater solvent action which will be useful in contaminate removal. This is also thought to be due to the higher terpene modification of the Composition.

Similar results were obtained using Composition 3, which appeared in all respects to be equivalent to Composition 2.

It can thus be seen that the present invention provides liquid soaps which offer significant advantages over presently used soaps and detergents in a variety of scouring and cleaning operations including the recycling of paper.

I claim:

1. A liquid soap for use in deinking printed paper stock comprising a partially saponified aqueous composition containing:
   (a) 1 part of a mixture of from 10 to 95% terpene alcohol and 90 to 5% terpene hydrocarbon, and
   (b) from 1 to 20 parts of a soap-making fatty acid, a glyceride oil or a mixture thereof (all parts and percentages being by weight),
   said composition containing less than 20% water and wherein said soap is saponified to an extent of about 50% neutralization.

2. A liquid soap according to either one of claim 1, wherein the composition comprises less than 20% water.

3. A liquid soap according to claim 2, wherein the composition comprises about 10% water.

4. A liquid soap according to any one of claims 1 to 3, wherein the saponifying agent is ammonium, potassium or sodium hydroxide or ethanolamine.

5. A liquid soap according to claim 4, wherein the saponifying agent is a 30% solution of sodium hydroxide.

6. A liquid soap according to claim 5, wherein less than 1 part of the 30% sodium hydroxide solution is added to the mixture of components (a) and (b) to effect partial saponification.

7. A liquid soap according to any one of claims 1 to 6, wherein the soap-making fatty acid is oleic acid, linoleic acid, vegetable-oil or fish-oil fatty acid, tallow fatty acid or mixtures thereof.

8. A liquid soap according to any one of claims 1 to 6, wherein the soap-making fatty acid is tall oil or distilled tall oil.

9. A liquid soap according to either one of claims 7 and 8, wherein the soap-making fatty acid has an acid number from 180 to 200 mg KOH/g.

10. A liquid soap according to any one of claims 1 to 6, wherein the glyceride oil is a glyceride of any the fatty acids mentioned in claims 7 and 8, or mixtures of such glycerides.

11. A liquid soap according to any one of the preceding claims, containing from 2 to 10 parts of soap-making fatty acid or glyceride oil or mixture thereof.

12. A liquid soap according to claim 11, containing from 2 to 5 parts of soap-making fatty acid or glyceride oil or mixture thereof.

13. A liquid soap according to any one of the preceding claims, wherein the mixture comprising component (a) is a pine oil.

14. A liquid soap according to claim 13, wherein the pine oil comprises about 90% terpene alcohols.

15. A process for deinking printed paper stock which comprises hydropulping such stock in water containing a composition as defined in claim 1 and submitting the diluted stock to flotation to separate the ink materials from the paper pulp.

* * * * *

UNITED STATES PATENT AND TRADEMARK OFFICE
CERTIFICATE OF CORRECTION

PATENT NO. : 4,483,742

DATED : 20 November 1984

INVENTOR(S) : Peter F. Bridle

It is certified that error appears in the above–identified patent and that said Letters Patent are hereby corrected as shown below:

Column 4, Line 64, delete "either one of".

*Signed and Sealed this*

*Twenty-first* Day of *May 1985*

[SEAL]

*Attest:*

DONALD J. QUIGG

*Attesting Officer*     *Acting Commissioner of Patents and Trademarks*